ROLL FORMING A QUANTITY OF GLASS CERAMIC CONTAINING AN EFFECTIVE AMOUNT OF AT LEAST 0.25 PERCENT BY WEIGHT OF FLUORINE.

THEREAFTER ROLL FORMING HIGH DIELECTRIC CONSTANT FLUORINE FREE GLASS CERAMIC WITH THE SAME ROLLERS.

INVENTOR.
Richard E. Allen
BY Walter S. Zebrowski
ATTORNEY

United States Patent Office 3,449,100
Patented June 10, 1969

3,449,100
METHOD OF CONDITIONING FORMING ROLLERS TO FORM GLASS CERAMIC
Richard E. Allen, Corning, N.Y., assignor to Corning Glass Works, Corning, N.Y., a corporation of New York
Filed Nov. 17, 1965, Ser. No. 508,266
Int. Cl. C03b 13/02, 39/00
U.S. Cl. 65—24                                                      5 Claims

ABSTRACT OF THE DISCLOSURE

A method of conditioning glass forming rollers to reduce adhesion thereto of molten high dielectric constant fluorine free glass ceramic and glass compositions by first rolling a quantity of molten glass ceramic or glass material containing an effective amount of at least 0.25 percent by weight of fluorine computed on a free fluorine basis and, thereafter, rolling said fluorine free composition by the same rollers.

---

Figures 1, 2:
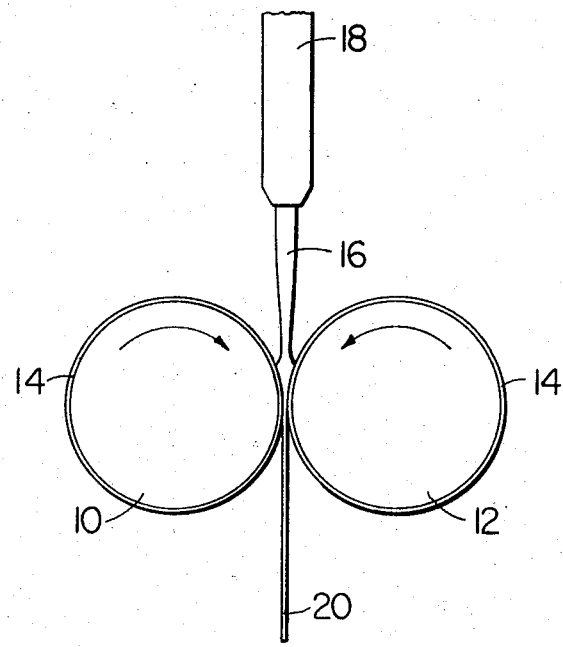

For the purposes of this invention the term glass ceramic is intended to include glass which can be ceramed after roll forming by proper treatment as well as other glass. A high dielectric constant as used herein is defined as at least 25.

In the roll forming of a thin glass ceramic ribbon such as is suitable for use as a dielectric in a stacked capacitor, it has been found that the fluorine free glass ceramic ribbon sticks to the rollers, is caused to whip around the rollers, completely wraps around the rollers, becomes checked, and breaks up into small pieces. Only very small amounts of ribbon could be made and that only under transient conditions. Such problems are magnified by the fact that such ribbon is very small and thin, as for example 0.0016 inch thick and 0.225 inch wide.

It is an object of the present invention to provide an economical method of producing significant quantities of thin glass ceramic ribbon.

Another object of this invention is to reduce the adhesion of molten glass ceramic ribbon to the surfaces of forming rollers.

Broadly, according to the present invention a method of conditioning glass forming rollers to reduce adhesion thereto of substantially fluorine free high dielectric constant glass ceramic material by roll forming with said rollers a quantity of glass ceramic containing an effective amount of at least 0.25 percent by weight of fluorine computed on a free fluorine basis, effective to condition said rollers, before rolling the fluorine free material.

Additional objects, features and advantages of the present invention will become apparent to those skilled in the art, from the following detailed description and the attached drawing on which, by way of example, only the preferred embodiment of this invention is illustrated.

FIGURE 1 is an elevation view of ribbon roll formed in accordance with the present invention.

FIFGURE 2 is a flow diagram illustrating the method of the present invention.

Referring to FIGURE 1, there is shown a pair of glass forming rollers 10 and 12. Rollers 10 and 12 have a coating 14 of $Al_2O_3$, on the rolling surfaces. A stream 16 of molten glass ceramic is emitted from a suitable nozzle 18 to the bite between the rollers. Ribbon 20 is formed by the rollers which rotate in the direction of the arrows shown.

In accordance with the present invention a quantity of molten glass ceramic containing an effective amount of at least 0.25 percent by weight of fluorine computed on a free fluorine basis is first rolled by rollers 10 and 12. Such rolling conditions the surface of the rollers to reduce the adhesion thereto of substantially fluorine free high dielectric constant glass ceramic. A material suitable for conditioning the rollers is as follows in percent by weight: 10.5 percent BaO, 8.5 percent SrO, 18.0 percent PbO, 48.0 percent $Nb_2O_5$, 7.5 percent $SiO_2$, 3.0 percent $Al_2O_3$, 2.5 percent $B_2O_3$, and 2.0 percent $BaF_2$.

In refining $Nb_2O_5$ fluorine may be used, and in such manufacture a fluorine residue remains. The amount of such a residue may be easily controlled. It has been found that if $Nb_2O_5$ containing such a fluorine residue is used in the glass ceramic batch materials, the resulting material may be used to condition the rollers for subsequent fluorine free materials, if the fluorine residue comprises an effective amount of at least 0.25 percent by weight of fluorine. A suitable example of a glass ceramic material which was prepared with such a fluorine residue containing $Nb_2O_5$ is as follows in weight percent exclusive of the fluorine: 12.5 percent BaO, 8.5 percent SrO, 17.5 percent PbO, 48.5 percent $Nb_2O_5$, 7.5 percent $SiO_2$, and 2.9 percent $Al_2O_3$, 2.5 percent $B_2O_3$, and 0.1 percent $Fe_2O_3$.

Other examples of compositions in weight percent, to which fluorine in effective amounts of at least 0.25 percent by weight may be added, effective for conditioning glass forming rollers, is shown in Table I.

TABLE I

| | |
|---|---|
| BaO | 11.5–14.1 |
| SrO | 7.9–9.6 |
| PbO | 16.0–19.7 |
| $Nb_2O_5$ | 43.5–53.5 |
| $SiO_2$ | 7.0–8.0 |
| $Al_2O_3$ | 2.5–3.5 |
| $B_2O_3$ | 2.0–3.0 |

After the rollers are conditioned, high dielectric constant, fluorine free glass ceramic, such as that shown in Table II in weight percent, can thereafter be roll formed into a ribbon.

TABLE II

| Examples | 1 | 2 |
|---|---|---|
| BaO | | 11.5–14.1 |
| SrO | | 7.9–9.6 |
| PbO | | 16.0–19.7 |
| $Nb_2O_5$ | 67.5 | 43.5–53.5 |
| $SiO_2$ | 14.0 | 6.0–9.0 |
| $Al_2O_3$ | 0.1 | 1.0–3.0 |
| $B_2O_3$ | 0.1 | 1.5–3.5 |
| CdO | 3.0 | |
| $Na_2O$ | 14.2 | |
| $TiO_2$ | 1.0 | |
| $Fe_2O_3$ | 0.1 | |

In Example 2, the total of $SiO_2$, $Al_2O_3$, and $B_2O_3$ being between 11 and 14 percent by weight.

A typical example of the present invention is as follows. A batch of material was prepared containing by weight 10.5 percent BaO, 8.5 percent SrO, 18.0 percent PbO, 48.0 percent $Nb_2O_5$, 7.5 percent $SiO_2$, 3.0 percent $Al_2O_3$, 2.5 percent $B_2O_3$, and 2.0 percent $BaF_2$. The batch was melted in a crucible and formed approximately 700 grams of molten material. It was then roll formed by a pair of $Al_2O_3$ clad steel rollers to suitably condition the rollers.

Thereafter a batch of high dielectric constant, fluorine free glass ceramic having a viscosity of 0.5 poise and a liquidus of 1200° C. was melted in a crucible and roll formed into a uniform ribbon having a thickness of about 0.0016 inch and a width of about 0.225 inch. The glass ceramic was composed by weight of 13.0 percent BaO, 9.0 percent SrO, 18.0 percent PbO, 48.0 percent $Nb_2O_5$, 7.5 percent $SiO_2$, 2.0 percent $Al_2O_3$, and 2.5 percent $B_2O_3$.

Before conditioning, the fluorine free glass ceramic readily adhered to the roller surfaces, whipped about and wrapped around the rollers in addition to checking and breaking into small pieces. After the rollers were conditioned about 1000 grams of excellent quality thin ribbon was produced before the conditioning wore off.

The compositions illustrated in Table II, Example 2 are suitable for manufacture of fluorine free ribbon for capacitor dielectric purposes.

Although the present invention has been described with respect to specific details of certain embodiments thereof, it is not intended that such details be limitations upon the scope of the invention except insofar as set forth in the following claims.

I claim:
1. In the process of rolling a high dielectric constant substantially fluorine-free glass ceramic comprising the steps of
   providing forming rollers having a cladding of $Al_2O_3$ on the rolling surfaces thereof, and
   rolling a molten stream of said fluorine-free ceramic by said clad rollers,
the improvement of conditioning said rollers to reduce the adhesion of said fluorine-free glass ceramic thereto comprising the step of
   rolling by said clad rollers a quantity of molten glass ceramic containing an effective amount of at least 0.25% by weight of fluorine computed on a free-fluorine basis for a period of time sufficient to reduce the adhesion thereto of said fluorine-free glass ceramic prior to said step of rolling thereof.

2. In the process of claim 1 fluorine containing glass ceramic consisting essentially by weight of 10.5% BaO, 8.5% SrO, 18.0% PbO, 48.0% $Nb_2O_5$, 7.5% $SiO_2$, 3.0% $Al_2O_3$, 2.5% $B_2O_3$, and 2.0% $BaF_2$.

3. In the process of claim 1 fluorine containing glass ceramic consisting essentially by weight of between 11.5 to 14.1% BaO, 7.9 to 9.6% SrO, 16.0 to 19.7% PbO, 43.5 to 53.5% $Nb_2O_5$, 7.0 to 8.0% $SiO_2$, 2.5 to 3.5% $Al_2O_3$, and 2.0 to 3.0% $B_2O_3$, to which has been added at least 0.25% by weight of fluorine, computed on a free-fluorine basis.

4. In the process of claim 3 fluorine-free glass ceramic consisting essentially by weight of between 11.5 to 14.1% BaO, 7.9 to 9.6% SrO, 16.0 to 19.7% PbO, 43.5 to 53.5% $Nb_2O_5$, 6.0 to 9.0% $SiO_2$, 1.0 to 3.0% $Al_2O_3$, and 1.5 to 3.5% $B_2O_3$, the total of $Si_2O$, $Al_2O_3$, and $B_2O_3$ being between 11 and 14%.

5. A process for rolling a thin ribbon of high dielectric constant substantially fluorine-free glass ceramic comprising the steps of
   providing glass rolling means having a cladding of $Al_2O_3$ on the rolling surfaces thereof,
   rolling by said clad rolling means a quantity of molten glass ceramic containing an effective amount of at least 0.25% by weight of fluorine computed on a free-fluorine basis for a period of time sufficient to reduce the adhesion to said surfaces of said fluorine-free glass ceramic, and thereafter
   rolling by said clad rolling means said fluorine-free glass ceramic in molten form, whereby said ribbon is formed without sticking to said clad surfaces.

References Cited

UNITED STATES PATENTS

| | | | |
|---|---|---|---|
| 1,422,036 | 7/1922 | Crowley et al. | 65—26 |
| 2,470,461 | 5/1949 | Black | 65—24 XR |
| 2,697,676 | 12/1954 | Black et al. | 65—24 XR |
| 3,208,839 | 9/1965 | Nordberg | 65—24 |
| 3,218,140 | 11/1965 | Francel et al. | 65—26 XR |
| 3,325,265 | 6/1967 | Stookey | 65—33 XR |
| 3,341,315 | 9/1967 | Patschorke | 65—26 XR |
| 3,347,650 | 10/1967 | Barkhan | 65—26 |

S. LEONE BASHORE, *Primary Examiner.*

FRANK W. MIGA, *Assistant Examiner.*

U.S. Cl. X.R.

65—23, 90, 101, 185, 245, 254

UNITED STATES PATENT OFFICE
CERTIFICATE OF CORRECTION

Patent No. 3,449,100                                   June 10, 1969

Richard E. Allen

It is certified that error appears in the above identified patent and that said Letters Patent are hereby corrected as shown below:

Column 1, line 61, "FIFGURE" should read -- FIGURE --. Column 4, line 5, "$Si_2O$" should read -- $SiO_2$ --.

Signed and sealed this 14th day of April 1970.

(SEAL)
Attest:

Edward M. Fletcher, Jr.                        WILLIAM E. SCHUYLER, JR.
Attesting Officer                                    Commissioner of Patents